E. P. NOYES.
VALVE APPARATUS.
APPLICATION FILED JULY 17, 1912.
1,069,166.
Patented Aug. 5, 1913.
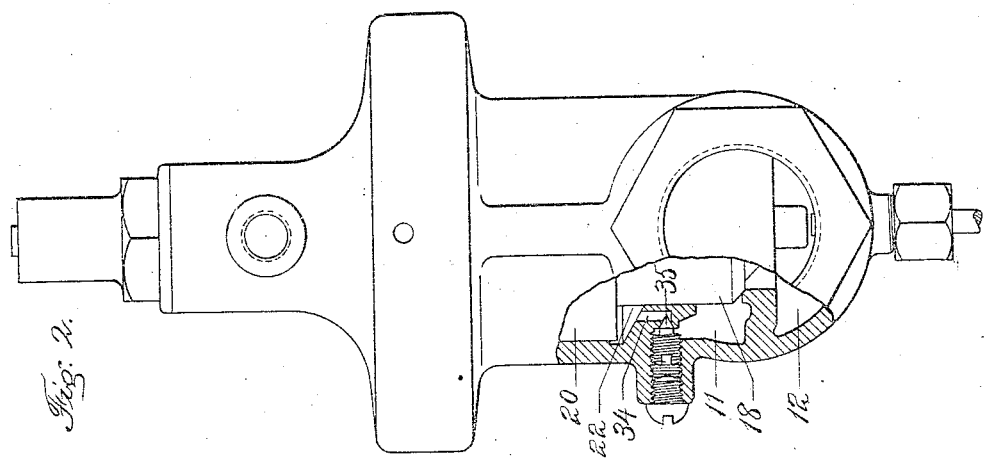
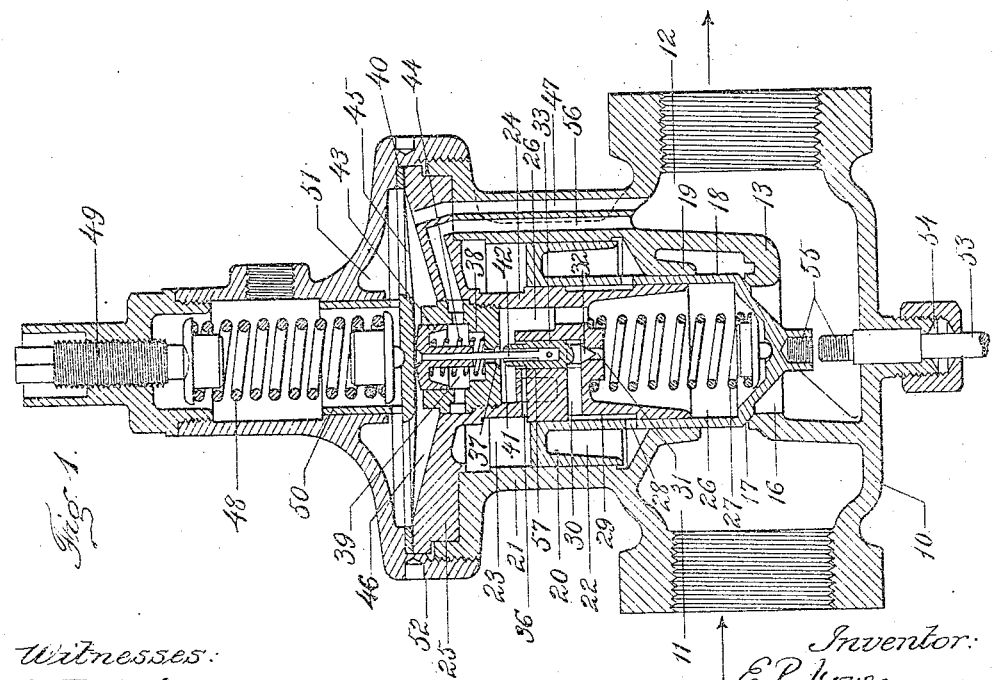
Witnesses:
G. Blake
M. E. Silliman
Inventor:
E. P. Noyes,
by Robert M. Pierson atty.

UNITED STATES PATENT OFFICE.

EDWARD P. NOYES, OF WINCHESTER, MASSACHUSETTS.

VALVE APPARATUS.

1,069,166.

Specification of Letters Patent.     Patented Aug. 5, 1913.

Application filed July 17, 1912. Serial No. 709,875.

*To all whom it may concern:*

Be it known that I, EDWARD P. NOYES, a citizen of the United States, residing at Winchester, in the county of Middlesex and State of Massachusetts, have invented certain new and useful Improvements in Valve Apparatus, of which the following is a specification.

This invention relates to valve devices employing a motor piston or other septum to operate the main valve, and a pilot valve or valves for controlling the pressure upon and the movements of said piston and main valve.

When the pilot valve or valves are under control of a septum responsive to the difference between the posterior pressure and a standard pressure such as atmosphere and a spring, the apparatus becomes a reducing valve.

My object is to provide a simple and delicately-controllable valve-apparatus which shall be substantially pressure-tight when closed.

In carrying out the invention I prefer the type of apparatus employing a single-seating main valve which closes with the flow and is easily kept pressure-tight when closed, but have observed that where the anterior or service-pipe pressure has free access to one side of the motor piston, the extreme pressure-differences tend to produce excessive leakage past the piston and also make it difficult to maintain a close regulation of the posterior pressure, especially when the latter is established at a small fraction of the anterior pressure. The use of only a single controlling chamber adjacent to a relatively large-diameter piston is often a further cause of poor regulative results. These objections may be overcome by employing some or all of the features of the present invention.

Of the accompanying drawings, Figure 1 represents a longitudinal vertical section, and Fig. 2 an end elevation partly in section showing a reducing valve apparatus constructed according to my invention.

10 is a casing having admission and discharge chambers 11, 12 containing the anterior and posterior pressures respectively, and divided by a fixed partition 13 having a port 16 controlled by the main valve 17. The latter is preferably a puppet-valve which seats with the flow as shown and is also preferably balanced or neutral as to the anterior pressure, its stem 18 being of the same diameter as the valve. This stem has a sliding fit in a fixed partition 19 and is connected at its upper end with an operating piston 20 working in a cylinder 21, there being a chamber 22 below said piston which I term a valve-opening chamber, and a chamber 23 above it which I term a valve-closing chamber. The valve stem is bored out centrally and slides on a fixed cylindrical or telescopic member 24 carried by a removable plate 25. 26 is a second valve-closing chamber whereby the main valve may be substantially balanced as to the posterior pressure, said chamber being formed in said cylindrical member and in the main valve stem 18, its lower part containing a light spring 27 which tends to seat the valve.

The chamber 22, which, with its means of pressure control, constitutes an important feature of my invention, is supplied by leakage from the anterior chamber 11, for example through the small duct 34 controlled by a screw-valve 35, and it discharges into the chamber 26 through holes 28 in the main valve stem, and an annular corridor 29, lateral passage 30 and port 31 in the telescopic member 24, this path of communication being controlled by a small conical or puppet valve 32 on the lower end of a sliding pilot valve member 33. Chamber 23 also derives its pressure by leakage from the anterior side of the main valve, in this case indirectly through chamber 22 and past the piston 20. Any suitable means for supplying anterior pressure to either of the chambers 22 or 23 may be employed. It is to be noted that when chamber 23 is supplied serially through chamber 22 as shown, the valve-closing pressure above piston 20 cannot rise higher than the valve-opening pressure below it, and I thus avoid any tendency of the main valve to slam against its seat when the outlet from chamber 22 is shut off.

The chamber 26 is in branch connection with the chamber 23 through a restricted passage 36 in the telescopic member 24, and it has an outlet to the posterior chamber 12 through a port 37 in a partition member or thimble 38 which is screwed into the plate 25, a chamber 39 formed in said thimble, and a duct 56 formed partly in plate 25 and partly in the main casing, the said outlet being controlled by a small conical or puppet valve 41 on the upper end of the pilot valve member 33. This valve 41 also ultimately controls the outlet from chamber 23, since the latter discharges into 26. The serial relation of these chambers and the control of their outlet by a single valve is mainly a matter of convenience, but has the advantage of insuring less liability of leakage when the main valve is closed and also permits a simple construction of the pilot member and its related parts. I prefer to also control or restrict the connecting passage 36 by a pilot valve, such as the piston portion 57 on member 33, although the restricted passage alone would allow sufficiently gradual changes of pressure in chamber 23 to avoid that tendency of the main valve to open or close all the way when once started, which would arise if chambers 23 and 26 were freely open to each other so as to constitute virtually one chamber.

In the construction here represented, the slight preponderance of area of the piston 20 on its upper side over the area of its lower side, overbalances or tends to produce downward pressure upon said piston when the pressures per square inch in chambers 22 and 23 are equal, but this construction may be varied. In my prior Patents Nos. 998,495, 991,230, and 1,013,213, are set forth methods of neutralizing, overbalancing or underbalancing piston-valves of this general character, which are applicable by the exercise of mechanical skill to the present invention.

The plate 25 and diaphragm 45 are retained by a spacer ring 40 and screw cap 52, on removing which the interior parts may be disassembled.

A stem 42, which passes through the port 37 connects the pilot-valve member with a head or follower 43 which is guided in the thimble 38 and elevated by a spring 44, the latter pressing the follower upwardly against a flexible diaphragm 45. Underneath the diaphragm is a chamber 46 connecting through a duct 47 with the posterior chamber 12, and said diaphragm is accordingly responsive to the posterior pressure. On its opposite side this diaphragm as usual is subject to a suitable standard pressure such as that of a spring 48 having an adjustment 49 and acting on the diaphragm through a follower 50, and atmospheric pressure in the chamber 51. The chambers 39 and 46 could be directly open to each other, since both contain posterior pressure, but in order to guard against false operation due to blowing of the discharge from port 37 onto the lower side of the diaphragm, I prefer to connect these two chambers with the posterior chamber 12 by means of the separate ducts 56 and 47.

53 is a telltale rod passing through a stuffing-box 54 in the lower wall of the valve casing and adapted to connect with the main valve through a separable screw-coupling 55, whereby the movements of the main valve may be indicated externally when desired and said valve may also be operated manually.

Fig. 1 shows the main valve 12 and the lower pilot valve 32 closed, which implies that the posterior pressure has just fallen sufficiently to cause the complete descent of diaphragm 45 and that the main valve would be just commencing to open. The dropping of the diaphragm has opened the upper pilot valve 41 and has reduced the pressure in chamber 26 to that of the posterior chamber 12. The valve 57 has also opened passage 36. The main valve is then held against its seat mainly by its weight and the pressure of spring 20, for the pressure in the valve-closing chamber 23 is rapidly being dissipated through the small passage 36, and the pressure in chamber 22, which had been reduced to that of the posterior chamber by the opening of valve 41, is now rising because its outlet through the chamber 26 has been closed by the pilot valve 32. As this valve-opening pressure comes to exceed the falling pressure in chamber 23 the main valve is opened against gravity and the pressure of the spring 27. The flow past said main valve replenishes the pressure in the posterior chamber 12, and this being communicated to the chamber directly below the diaphragm 45, the latter rises. The first effect is to blow down the pressure in chamber 22 into the central chamber 26 by the opening of pilot valve 32, and as the diaphragm rises farther the passage 36 is closed and then the outlet from chamber 26 to the posterior chamber is stopped by the closure of the upper pilot valve 41. Thereafter all leakage past the partition 19 will tend to spread itself through the chambers above said partition as far as the valve 41, the piston 20 becomes substantially pressure-balanced and the rising pressure in chamber 26 coöperates with gravity and the spring 27 to close the main valve and stop all further on-flow into the posterior chamber 12 until the pressure in the latter has again fallen away slightly;

whereupon the above sequence of operations is repeated.

It will be noted that by this construction the fluid-pressure differences acting upon the main valve piece are relatively small and yet prompt in their operation, and the construction is such that the pilot-valve devices may operate through a very small range of movement and serve to effect a close regulation of the posterior pressure. The sliding fits of the main valve and piston member may be fairly free in character because when the main valve is open and the pressure-differences tend to cause leakage past said surfaces, such leakages being relatively small in volume, do not adversely affect the operation of the apparatus. When the upper pilot valve 41 is closed it is held to its seat by the pressure acting on the lower end of the member 33. The areas of this member are preferably quite small and the stem 42 is of stiff material, construction, and mounting so that its diameter may be kept small. By this invention I am also enabled, if desired, to concentrate all the fluid operating and control devices at one side of the main valve, while making this member of the single-seating, substantially balanced or balanceable type, as shown in the illustration.

I claim,—

1. In valve apparatus, the combination of a casing having anterior and posterior chambers connected by a port, a main puppet valve controlling said port and adapted to close in the direction of flow, a cylinder, a piston in said cylinder connected by a stem with said valve and having valve-opening and valve-closing chambers on its inner and outer sides respectively, supplied by leakage from said anterior chamber, and valve means for controlling the discharge from said cylinder chambers.

2. In valve apparatus, the combination of a casing having anterior and posterior chambers connected by a port, a cylinder on said casing separated from the anterior chamber by a partition, a main valve controlling said port and having a stem guided in said partition and a piston in said cylinder with valve-opening and valve-closing chambers on opposite sides of it, said valve-opening chamber being supplied by leakage from the anterior chamber, and pilot valve devices controlling the discharge from said valve-opening and valve-closing chambers.

3. In valve apparatus, the combination of a casing having anterior and posterior chambers connected by a port, a main valve controlling said port and having an operating septum, valve-opening and valve-closing chambers on opposite sides of said septum, a second valve-closing chamber, a restricted passage connecting the anterior chamber with the valve-opening chamber, a restricted passage connecting the two valve-closing chambers, and means for controlling the discharge of pressure from said chambers.

4. In valve apparatus, the combination of a main valve having an operating septum, valve-opening and valve-closing chambers on opposite sides of said septum, a second valve-closing chamber on the same side of the valve as the aforesaid chambers, means for supplying throttled pressure to said chambers from the anterior side of the valve, and pilot-valve mechanism controlling the discharge from said chambers.

5. In valve apparatus, the combination of a casing having anterior and posterior chambers connected by a port, a cylinder on said casing, a main valve controlling said port, a piston in said cylinder connected with the valve and having on one side a valve-opening chamber which derives its pressure by leakage from the anterior side of said valve and on the other side a valve-closing chamber which derives its pressure by leakage from the valve-opening chamber, and pilot-valve mechanism controlling the discharge from said valve-opening and valve-closing chambers.

6. In valve apparatus, the combination of a casing having anterior and posterior chambers connected by a port, a cylinder on said casing separated by a partition from said anterior chamber, a valve member having a valve controlling said port, a hollow stem slidable in said partition and a piston in said cylinder with valve-opening and valve-closing chambers on opposite sides thereof, said valve-opening chamber having a restricted inlet from the anterior chamber, a fixed member telescoping in said hollow stem and forming with the valve member a second valve-closing chamber, a passage connecting the two valve-closing chambers, and pilot-valve mechanism controlling the discharge from said valve-opening and valve-closing chambers.

7. In valve apparatus, the combination of a casing having anterior and posterior chambers connected by a port, a main valve controlling said port and having an operating septum, valve-opening and valve-closing chambers on opposite sides of said septum, a second valve-closing chamber connected with the first valve-closing chamber, and a single pilot-valve member having pilot valves controlling the discharge from the valve opening and the two valve-closing chambers.

8. In valve apparatus, the combination of a main valve, a cylinder, a piston therein having a hollow stem extended through a bearing in the wall of said cylinder and connected with said main valve, a fixed member telescoping in said hollow stem, and pilot valves mounted in said fixed member and controlling the discharge from the two ends of said cylinder.

9. In valve apparatus, the combination of a member provided with a main valve and a motor piston, a valve-opening chamber on one side of said piston having a restricted inlet for the pressure anterior to said main valve, a valve-closing chamber on the opposite side of said piston, a second valve-closing chamber adjacent to said member connected by a restricted passage with the first valve-closing chamber and having an inlet from the valve-opening chamber and an outlet to the posterior side of the main valve, and a pilot valve member having oppositely-closing pilot valves controlling said inlet and outlet respectively.

10. In valve apparatus, the combination of a member provided with a main valve and a motor piston, a valve-opening chamber on one side of said piston having a restricted inlet for the pressure anterior to said main valve, a valve-closing chamber on the opposite side of said piston, a second valve-closing chamber adjacent to said member connected by a restricted passage with the first valve-closing chamber and having an inlet from the valve-opening chamber and an outlet to the posterior side of the main valve, and a pilot valve member having oppositely-closing pilot valves controlling said inlet and outlet respectively, and an intermediate pilot valve controlling said restricted passage and closing oppositely to the valve which controls said inlet.

11. In valve apparatus the combination of a casing having anterior and posterior chambers connected by a port, a cylinder, a member having a main valve controlling said port, a piston in said cylinder and a connecting hollow stem, a fixed hollow cylindrical member telescoping in said hollow stem and forming with said valve member a valve-closing chamber, a restricted passage in said cylindrical member connecting said valve-closing chamber with the valve-closing end of said cylinder, an outlet from said valve-closing chamber, an inlet thereto from the valve-opening end of the cylinder, and a pilot valve member mounted in said cylindrical member and having pilot valves at opposite ends controlling said inlet and outlet respectively.

12. Reducing-valve apparatus comprising a casing having anterior and posterior chambers connected by a port, an actuating member connected with said valve and having valve-opening and valve-closing chambers on its opposite sides supplied by leakage pressure, a pilot member formed with oppositely-closing puppet valves controlling the discharge from the last-said chambers, a port through which the discharge from both of said chambers escapes to the posterior chamber, a septum responsive to the posterior pressure, and a stem connecting said septum with the pilot member and passing through said discharge port.

13. Reducing valve apparatus comprising a casing having anterior and posterior chambers connected by a port, a member having a main valve controlling said port and a motor piston with valve-opening and valve-closing chambers on opposite sides of it, a third chamber for substantially balancing the valve as to posterior pressure, and a septum responsive to the posterior pressure and controlling the pressures in said valve-opening, valve-closing, and balancing chambers.

14. Reducing valve apparatus comprising a casing having anterior and posterior chambers connected by a port, a member having a main valve controlling said port, and a motor piston, and forming with said casing valve-opening and valve-closing chambers on opposite sides of the piston, the former supplied by leakage from the anterior chamber, and a second valve-closing chamber having an inlet from the valve-opening chamber, an outlet to the posterior chamber, and a restricted connection with the first valve-closing chamber, a pilot-valve member having oppositely-seating valves controlling said inlet and outlet respectively, and a septum responsive to the posterior pressure and controlling said pilot-valve member.

15. The combination of a casing having anterior and posterior chambers connected by a port, a cylinder on said casing, a member having a piston in said cylinder, a main valve controlling said port and a connecting hollow stem passing through the inner end of said cylinder, a removable plate carrying a fixed member telescoping in said hollow stem and forming a central chamber with the main valve and piston member, passages connecting said central chamber with the opposite ends of said cylinder and with the posterior chamber, a passage connecting the anterior chamber with the inner end of said cylinder, a diaphragm at the outer end of said cylinder having a chamber on one side open to the posterior chamber, a cap removably connected with the outer end of said cylinder, a spring interposed between said cap and the diaphragm, and pilot valve mechanism controlled by said diaphragm and controlling the pressures on said main valve and piston member.

16. Reducing valve apparatus comprising a valve casing, a cylinder thereon, a member having a piston in said cylinder, a main valve and a hollow connecting stem, a removable plate covering the outer end of said cylinder and having a fixed cylindrical member telescoping in said hollow stem, a pilot-valve seat on said cylindrical member, a part removably mounted on said plate and having another pilot-valve seat, a pilot-valve member mounted on said cylindrical member and having valves at its opposite ends coöperating with said seats, a cap for retaining said plate, and a diaphragm interposed between said cap and plate and controlling said pilot-valve member.

In testimony whereof I have hereunto set my hand in the presence of two subscribing witnesses, this 12th day of July, 1912.

EDWARD P. NOYES.

Witnesses:
P. W. PEZZETTI,
G. L. JOHNSON.